Nov. 25, 1924.
G. W. DICKINSON
HUB PULLER
Filed July 9, 1923
1,516,764
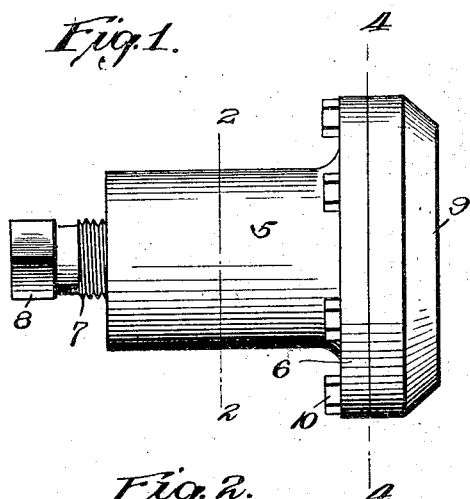
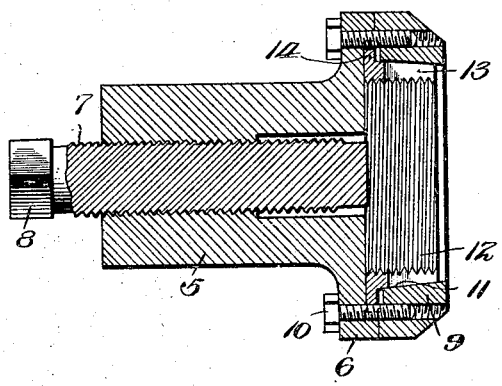
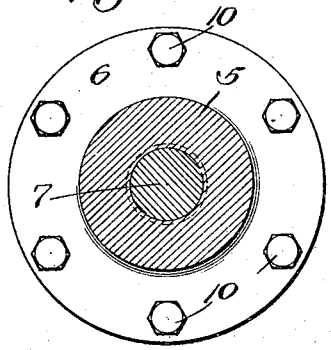
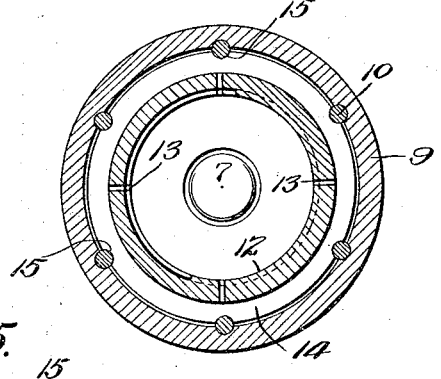
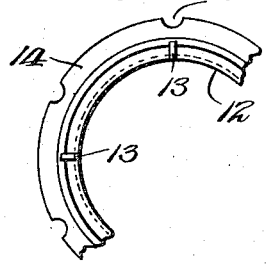
Inventor:
G. W. Dickinson
By Clarence O'Brien
Attorney Patented Nov. 25, 1924.

1,516,764

UNITED STATES PATENT OFFICE.

GEORGE W. DICKINSON, OF ALBION, MICHIGAN.

HUB PULLER.

Application filed July 9, 1923. Serial No. 650,533.

*To all whom it may concern:*

Be it known that GEORGE W. DICKINSON, a citizen of the United States, residing at Albion, in the county of Calhoun and State of Michigan, has invented certain new and useful Improvements in Hub Pullers, of which the following is a specification.

This invention relates to hub pullers, and has particular reference to devices for removing hubs of vehicle wheels from the axle shaft thereof.

An object of the invention is to provide a device of the above kind wherein the gripping engagement with the wheel hub increases in proportion to the thrust applied by the thrust screw of the device upon the axle shaft.

Another object is to provide a device of the above kind which shall be extremely durable and efficient in operation, and which embodies the desired qualities of simplicity and cheapness and ease of manufacture and use.

Other objects will appear as the nature of the invention is better understood, and the same consists in the novel form, combination and arrangement of parts hereinafter more fully described, shown in the accompanying drawings and claimed.

In the drawings, wherein like reference characters indicate corresponding parts throughout the views, Figure 1 is a side elevational view of a hub puller constructed in accordance with the present invention, Figure 2 is a transverse sectional view taken on line 2—2 of Figure 1, Figure 3 is a central longitudinal sectional view of the device shown in Figure 1, Figure 4 is a transverse sectional view taken substantially on line 4—4 of Figure 1, and Figure 5 is a fragmentary face view of the hub engaging ring.

Referring more in detail to the drawings, the invention embodies a body member 5 which is provided with an annular outwardly directed flange 6 at one end thereof which is widened at its margin as indicated in Figure 3, said body member 5 being provided with an axial bore, a portion of which is screw threaded for threaded reception of the thrust screw 7. This thrust screw has its outer end formed of angular shape as at 8 for the reception of an operating wrench or handle, and the inner end of the same is adapted to impinge against the end of the axle shaft as will become apparent from the following description.

A ring 9 having an internally reduced inner end portion corresponding in width to the width of the widened portion of the flange 6, is bolted to the flange 6 as at 10, these bolts being passed through suitable openings in the flange 6 and being threaded into openings in the ring member 9.

The ring member 9 is provided with a beveled inner surface as at 11 cooperating with the beveled outer surface of a jaw ring 12 which is disposed within the ring 9, whereby upon outward displacement of the jaw ring 12, said jaw ring will contract as allowed by the longitudinal slots 13 provided in said jaw ring and extending inwardly from its outer edge for a major portion of its length.

The inner end of the jaw ring 12 is provided with an outwardly directed annular flange 14 which is narrower than the recess provided between the flange 6 and the ring member 9 for allowing outward displacement of the jaw ring for a limited distance. The flange 14 of the jaw ring is provided with marginal notches 15 in which the bolts 10 are positioned for holding the jaw ring against rotation relative to the members 5 and 9, and the interior of the ring 12 is screw threaded as shown clearly in Figure 3 to be screwed upon the threaded end of the wheel hub.

In use, the entire device is rotated to thread the jaw ring 12 onto the hub, after which the thrust screw 7 is rotated inwardly of the body member 5 so that the inner end of the screw 7 will engage and impose a thrust upon the adjacent end of the axle shaft upon which the hub is tightly mounted. Upon further turning of the screw 7, the body member 5 and ring 9 are displaced relative to the jaw ring 12 so that the cooperating beveled surfaces of the ring members 9 and 12 will cause the jaw ring to contract into tight engagement with the hub as allowed by the slots 13. Continued turning movement of the thrust screw 7 will result in drawing or pulling the wheel hub off of the axle shaft for a sufficient distance to loosen the same so that it may be entirely removed manually, with ease.

It is believed that the construction and operation as well as the advantages of the invention will be readily understood and appreciated by those skilled in the art from the foregoing description.

Minor changes may be made without departing from the spirit and scope of the invention as claimed.

What I claim as new is:

1. A hub puller comprising a body having an annular outturned flange upon one end thereof and provided with an axial screw threaded bore, a thrust screw threaded into said bore and adapted to impinge the end of an axle shaft, a ring fixed upon the flange of said body member and having an internal beveled surface, an internally threaded jaw ring adapted to be screwed onto the threaded end of a wheel hub and arranged within said first named ring, said jaw ring having a beveled outer surface cooperating with the beveled inner surface of the first named ring for contracting the jaw ring upon relative outward displacement of the jaw ring, said jaw ring being provided with longitudinal slots extending inwardly from its outer edge for permitting its contraction.

2. A hub puller comprising a body having an annular out-turned flange upon one end thereof and provided with an axial screw threaded bore, a thrust screw threaded into said bore and adapted to impinge the end of an axle shaft, a ring fixed upon the flange of said body member and having an internal beveled surface, an internally threaded jaw ring adapted to be screwed onto the threaded end of a wheel hub and arranged within said first named ring, said jaw ring having a beveled outer surface cooperating with the beveled inner surface of the first named ring for contracting the jaw ring upon relative outward displacement of the jaw ring, said jaw ring being provided with longitudinal slots extending inwardly from its outer edge for permitting its contraction, said flange of the body member being widened at its marginal portion, said first named ring member being reduced in width internally at its inner end in correspondence to the width of the widened portion of the flange, and said jaw ring having an annular out turned flange upon its inner end loosely arranged within the recess provided by the reduced end of the first named ring and the widened portion of the flange.

3. A hub puller comprising a body having an annular out turned flange upon one end thereof and provided with an axial screw threaded bore, a thrust screw threaded into said bore and adapted to impinge the end of an axle shaft, a ring fixed upon the flange of said body member and having an internal beveled surface, an internally threaded jaw ring adapted to be screwed onto the threaded end of a wheel hub and arranged within said first named ring, said jaw ring having a beveled outer surface cooperating with the beveled inner surface of the first named ring for contracting the jaw ring upon relative outward displacement of the jaw ring, said jaw ring being provided with longitudinal slots extending inwardly from its outer edge for permitting its contraction, said flange of the body member being widened at its marginal portion, said first named ring member being reduced in width internally at its inner end in correspondence to the width of the widened portion of the flange, and said jaw ring having an annular out turned flange upon its inner end loosely arranged within the recess provided by the reduced end of the first named ring and the widened portion of the flange, the flange of said jaw ring being provided with marginal notches, and said body member and said first named ring being rigidly connected by means of screws arranged within said notches for preventing relative rotation of the jaw ring, the first named ring and said body member.

4. A hub puller comprising a body member having a socket upon its outer end with the interior surface of the same beveled, said socket being provided with an undercut recess at the inner end of the same, a jaw ring having resilient jaw portions and disposed within said socket said jaw ring having a beveled outer surface cooperating with the beveled inner surface of the socket for contracting the jaw ring when the latter is displaced outwardly, said jaw ring being provided with a threaded internal wall to be screwed upon the threaded end of a wheel hub and having an annular flange arranged within said recess of the socket for limiting the outward displacement of the jaw ring.

In testimony whereof I affix my signature.

GEORGE W. DICKINSON.